United States Patent
Yang et al.

(10) Patent No.: US 9,679,123 B2
(45) Date of Patent: Jun. 13, 2017

(54) PASSWORD AUTHENTICATION SYSTEM AND PASSWORD AUTHENTICATION METHOD USING CONSECUTIVE PASSWORD AUTHENTICATION

(71) Applicant: Rowem Inc., Guro-gu, Seoul (KR)

(72) Inventors: Giho Yang, Seoul (KR); Jaeyeob Hwang, Goyang-si (KR)

(73) Assignee: Rowem Inc. (KR)

( * ) Notice: Subject to any disclaimer, the term of this patent is extended or adjusted under 35 U.S.C. 154(b) by 0 days.

(21) Appl. No.: 14/414,061

(22) PCT Filed: Jul. 12, 2013

(86) PCT No.: PCT/KR2013/006284
§ 371 (c)(1),
(2) Date: Jan. 9, 2015

(87) PCT Pub. No.: WO2014/011001
PCT Pub. Date: Jan. 16, 2014

(65) Prior Publication Data
US 2015/0205942 A1    Jul. 23, 2015

(30) Foreign Application Priority Data

Jul. 12, 2012 (KR) ......................... 10-2012-0075916
Jul. 9, 2013 (KR) ......................... 10-2013-0080527

(51) Int. Cl.
G06F 21/31    (2013.01)
H04L 29/06    (2006.01)

(52) U.S. Cl.
CPC ............ *G06F 21/31* (2013.01); *H04L 63/083* (2013.01)

(58) Field of Classification Search
None
See application file for complete search history.

(56) References Cited

U.S. PATENT DOCUMENTS 6,449,683 B1 * 9/2002 Silvester ............... G06F 1/3203
                                                            711/103
8,141,140 B2 * 3/2012 Wenzel ................... G06F 21/41
                                                            713/182
(Continued)

FOREIGN PATENT DOCUMENTS

KR    10-2009-0002355    1/2009
KR    10-2011-0119521    11/2011
(Continued)

OTHER PUBLICATIONS

International Search Report for International Application No. PCT/KR2013/006284 dated Nov. 14, 2013, 4 pages, Republic of Korea.

*Primary Examiner* — Benjamin Lanier
(74) *Attorney, Agent, or Firm* — Thorpe North & Western (57) ABSTRACT

Disclosed is a password authentication system and a password authentication method using continuous password authentication. In the password authentication system, a password is set using an original password and a shift value, and the password authentication system includes a password authentication unit configured to receive a password subjected to the shift value, apply the shift value inversely to the password to obtain the original password and perform authentication processing, a defense mode changing unit configured to change to a defense mode requiring continuous authentication of the password at least twice, and a defense mode control unit configured to require the user to continuously input a first password and a second password, and to determine the authentication of the password as a success and release the defense mode.

12 Claims, 5 Drawing Sheets

(56) References Cited

U.S. PATENT DOCUMENTS

| | | | | |
|---|---|---|---|---|
| 8,528,049 | B1* | 9/2013 | Khen | G06F 21/36 382/119 |
| 2003/0105959 | A1* | 6/2003 | Matyas, Jr. | G06F 21/31 713/168 |
| 2005/0114673 | A1* | 5/2005 | Raikar | G06F 21/46 713/182 |
| 2006/0053301 | A1* | 3/2006 | Shin | G06F 21/36 713/183 |
| 2006/0197685 | A1* | 9/2006 | Wormald | G06F 3/0233 341/22 |
| 2008/0005577 | A1* | 1/2008 | Rager | G06F 21/575 713/183 |
| 2008/0077984 | A1* | 3/2008 | Kim | H04L 63/083 726/18 |
| 2009/0276837 | A1* | 11/2009 | Abzarian | H04L 9/3226 726/5 |
| 2013/0047237 | A1* | 2/2013 | Ahn | H04L 9/3226 726/7 |
| 2013/0067546 | A1* | 3/2013 | Thavasi | G06F 21/31 726/7 |
| 2013/0067566 | A1* | 3/2013 | Oh | G06F 21/31 726/19 |
| 2013/0122866 | A1* | 5/2013 | Huang | G06F 21/31 455/411 |
| 2015/0128257 | A1* | 5/2015 | Zhao | H04M 1/67 726/19 |

FOREIGN PATENT DOCUMENTS

| | | | | |
|---|---|---|---|---|
| KR | 20110119521 A | * | 11/2011 | H04L 9/3226 |
| WO | WO 2008-105602 | | 9/2008 | |

* cited by examiner

PASSWORD AUTHENTICATION SYSTEM AND PASSWORD AUTHENTICATION METHOD USING CONSECUTIVE PASSWORD AUTHENTICATION

CROSS-REFERENCE TO RELATED APPLICATION

The present application claims priority to Korean Patent Application No. 10-2012-0075916 filed on Jul. 12, 2012 in the Republic of Korea and Korean Patent Application No. 10-2013-0080527 filed on Jul. 9, 2013 in the Republic of Korea, the disclosures of which are incorporated herein by reference.

BACKGROUND

1. Field of the Technology

The present disclosure relates to password authentication technology, and more particularly, to a password authentication system with enhanced security based on continuous authentication of a user password and a password authentication method.

2. Description of the Related Art

A password made up of an image (for example, an icon), also known as an image password, inputted from a user is difficult to steal even though a third party peeps at a password input situation of the user. Moreover, when a password is set using an image subjected to a shift value from an original password, it is more difficult for a third party to peep at, contributing to enhanced security.

The password to which the shift value is applied refers to, for example, a password a user inputs using an image subjected to a shift value from an image of an original password on a password input screen where a plurality of images is randomly arranged. When the shift value is shift right by 1 and shift up by 1, the user inputs, as a password, an image at a location after the image of the original password is shifted right by 1 and shifted up by 1, instead of the image of the original password. For authentication processing of the password inputted from the user, the shift value is inversely applied to obtain the original password, and then authentication processing is performed.

Here, the authentication method of the image password to which the shift value is applied improves security, but when a third party inputs passwords randomly, there is a probability that password authentication would succeed by accident. A third party may repeatedly attempt to input passwords continuously until authentication succeeds.

In a situation in which a plurality of passwords is set, when authentication succeeds for each password, services corresponding to each password for which authentication succeeded may be provided. In this case, when a third party attempts attacks such as by randomly entering passwords, there is a probability that the plurality of passwords would be leaked to the third party. Here, processing of the plurality of passwords is performed with the same importance. That is, when authentication succeeds for each password, corresponding services are provided. However, when there is a more important password among the plurality of passwords, there is a need for measures to provide greater security for the password with greater importance.

SUMMARY

The present disclosure provides a password authentication system that performs authentication processing following a user's password input continuously twice or more when user password authentication fails, and a password authentication method.

When a plurality of passwords is set and unique services corresponding to each password are provided, the present technology may perform authentication processing on a more important password continuously twice or more.

A password authentication system according to one embodiment of the present disclosure, in which a password is set by a user using an original password and information associated with a shift value, receives an input of the password subjected to the shift value from the user and determines whether authentication of the password succeeded, and the password authentication system includes a password authentication unit configured to apply the shift value inversely to the password inputted from the user to obtain the original password and perform authentication processing, a defense mode changing unit configured to change to a defense mode requiring continuous authentication of the password at least twice when the authentication processing fails, and a defense mode control unit configured to, in the defense mode, require the user to input a first password, when authentication processing of the inputted first password of the user succeeds through the password authentication unit, to require the user to input a second password, and when authentication processing of the inputted second password of the user continuously succeeds through the password authentication unit, to determine the authentication of the password of the user as a success and release the defense mode.

In the present disclosure, the password may include at least one of number, character and image icons, and a plurality of icon objects may be randomly arrange on a screen for each password input instance and selected as the password by the user.

Here, the password may be set by the user using the original password and the information associated with the shift value, and for the password requested for authentication, the password authentication unit may apply the shift value inversely to obtain the original password and perform authentication processing.

Further, the defense mode changing unit may change from a normal mode to the defense mode when the number of authentication failures of the password exceeds a preset number of times in the normal mode.

Also, the defense mode control unit may notify the defense mode through an input screen of the password.

Here, the defense mode control unit may omit to notify the user of an individual authentication result until authentication of the password of the user succeeds continuously during the defense mode, and when authentication of the password succeeds continuously, notify the success through a screen.

According to another embodiment of the present disclosure, the password authentication system may further include a multi-password setting unit configured to receive setting of a plurality of passwords of the user including a first password and a second password with higher security than the first password, and a service providing unit configured to provide a unique service corresponding to a password for which authentication succeeded when authentication processing of any one of the plurality of passwords succeeds by the password authentication unit.

Here, the password authentication system may further include a secret mode changing unit configured to change to a secret mode requiring continuous repeated authentication of the second password when authentication of the second password inputted in a normal mode succeeds, and a secret mode control unit configured to, in the secret mode, require the user to re-input the second password, and when authentication processing of the inputted second password of the user succeeds through the password authentication unit, determine the authentication of the second password of the user as a success and release the secret mode, and the service providing unit may provide a corresponding first service when authentication of the first password inputted in the normal mode succeeds, and provide a corresponding second service when authentication of the second password inputted in the secret mode succeeds.

Also, wherein when an input of the first password is received, the secret mode control unit may change to the normal mode and notify a password input, or may determine the authentication as a failure and change to a defense mode.

A password authentication method according to one embodiment of the present disclosure is performed by a password authentication system in which a password is set by a user using an original password and information associated with a shift value, and which receives an input of the password subjected to the shift value from the user and determines whether authentication of the password succeeded, and the password authentication method includes (a) a password authentication step of applying the shift value inversely to the password inputted from the user to obtain the original password and performing authentication processing, (b) a defense mode changing step of changing to a defense mode requiring continuous authentication of the password at least twice when the authentication processing fails, (c) a first password input step of, in the defense mode, requiring the user to input a first password, (d) a second password input step of, when authentication processing of the inputted first password of the user succeeds through the step (a), requiring the user to input a second password, and (e) a defense mode release step of, when authentication processing of the inputted second password of the user continuously succeeds through the step (a), determining the authentication of the password of the user as a success and releasing the defense mode.

According to one aspect of the present disclosure, in a password authentication method which inputs an image subjected to a shift value from an actual password as a password while images are randomly arranged for each input instance, continuous password authentication is required to defend a random attack by a third party and identify a genuine password user, thereby maintaining high security.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

<1. System Architecture>

Figure 1:
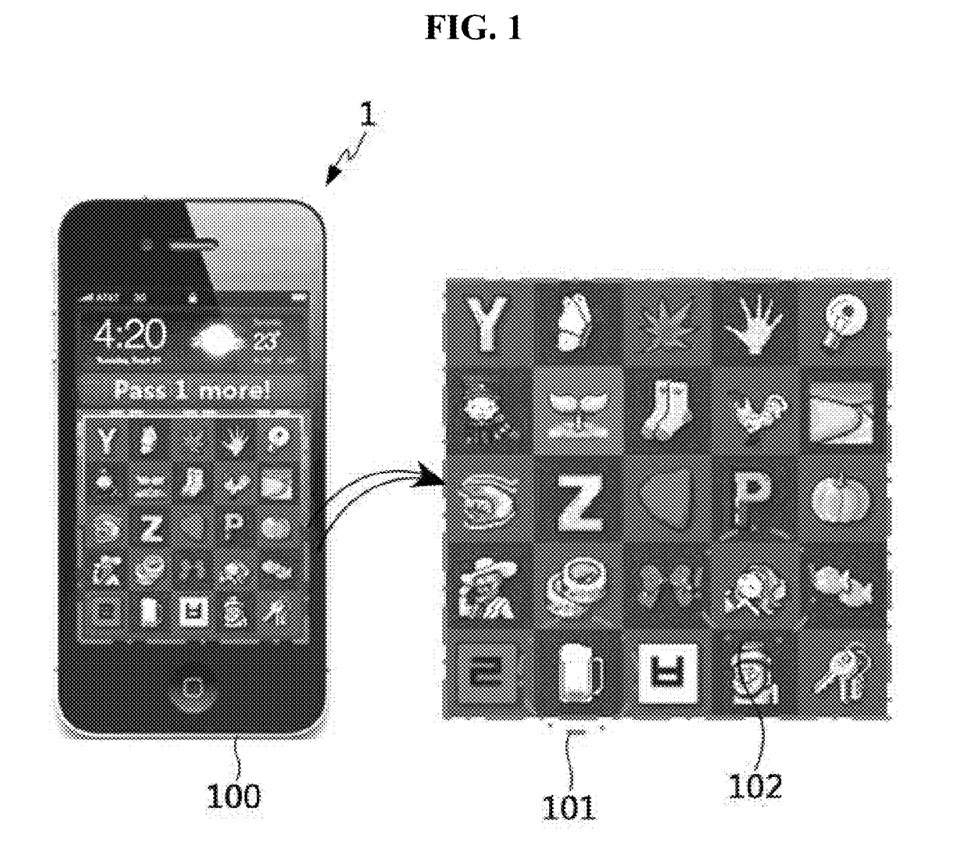
FIG. 1 is a diagram illustrating an example of a user terminal implemented as a password authentication system of the present disclosure.

FIG. 1 is a diagram illustrating an example of a user terminal implemented as a password authentication system 1 of the present disclosure.

The password authentication system 1 is implemented as a user terminal 100, and in a situation in which security is required, a user is required to input a password continuously at least twice, and when authentication succeeds continuously, the user is determined to be a genuine user. For example, when authentication of the password inputted from the user succeeds first, the user is required to immediately re-input the password and then authentication is performed and should succeed. When the second authentication fails after the first authentication succeeds, the first successful authentication is invalidated and the first password needs to be inputted again.

Here, the user terminal 100 includes a computer terminal, a smart terminal, and a home automation terminal, and there is no special limitation thereon. The user terminal 100 is a terminal or device that may receive an input of a password from a user, and when authentication of the password succeeds, perform unique processing or provide a unique service, and corresponds to the password authentication system 1.

In a local environment, the user terminal 100 may authenticate the user password autonomously. Also, in a client-server environment, the user terminal 100 may transmit the password inputted from the user to a server via a wired/wireless network to request authentication processing, and receive a result of the authentication processing from the server.

For convenience of description, assuming that the password authentication system 1 is the user terminal 100 in a local environment, the user terminal 100 displays a password input screen where a plurality of buttons or keys are randomly arranged. The button is allocated with at least one of a character, a number, and an image. Also, the buttons change in position at random for each password input instance, and the images allocated to each button also change at random. Thus, the allocated buttons used for the user to select a password change in position for each input instance. The user selects a button corresponding to a set password, thereby the password input is completed. Then, the user terminal 100 performs password authentication, and when authentication succeeds, provides a unique service. The service may include various services such as screen unlocking, application execution, and login processing, and there is no special limitation thereon.

Here, the password is set using an original password and a shift value. Thus, when the user inputs a password, the user presses a button of an image determined by applying a shift value to an original password, rather than inputting the original password. For example, assume a first button 101 is an original password and a shift value is (2, 1), when the user selects a password, the user should select a second button 102 to which the shift value is applied, rather than the first button 101, and in this case, the password is determined to be a valid password and authentication succeeds. In contrast, when the second button 102 is an original password and the shift value is (3, 4), (3, −1), (−2, 4) or (−2, −1), the user should input the first button 101 as a password, and in this case, authentication succeeds.

Because for each input instance, the images allocated to the buttons change in type and position and the shift value is applied to the password, the password is safely protected from peeping of a vicious third party. However, when a third party attempts attacks such as by randomly inputting passwords, password authentication may succeed by accident.

Calculating a probability of success of random attacks, in the case of a 4-digit password using 4 buttons selected among 25 buttons as shown in FIG. 1, a probability of success of a first digit is 1/25. Then, probabilities of success of the remaining digits are 1/24, 1/23, and 1/22, respectively. A probability of success of the 4-digit password calculated by multiplying the probabilities of success of the four individual digits is 1/(24×23×22×21)=1/303,600.

Generally, a probability of success of a 4-digit number password determined by inputting the numbers 0-9 is 1/10×10×10×10=1/10,000. However, provided that only when the password is inputted twice continuously and authentication succeeds continuously each time, authentication is determined as a success, when other user attempts to randomly input password and authentication succeeds for first authentication, the password for which authentication succeeded is immediately re-inputted for second authentication, so it does not take more time to succeed in the second authentication after the first authentication succeeds and second success does not reduce in probability and is guaranteed.

However, the password scheme of the present disclosure arranges images at random for each input instance and applies a shift value to a password, thereby effectively preventing a third party from peeping at. Also, because an attacker is not aware of a set shift value, when the attacker presses a button as a password, the attacker cannot know a button of an actual password to which the shift value is applied, so it is almost impossible to press a button subjected to the shift value from the button of the actual password twice continuously. That is, because the password scheme of the present disclosure prevents entering the same value twice like a number password, there is no choice but to press buttons randomly. Thus, a probability that success occurs twice continuously by accident equals 1/92,172,960,000 calculated by multiplying a probability of being successful at a first attempt by accident 1/303,600 and a probability of being successful again by accident 1/303,600 together. As calculated, the authentication policy requiring continuous authentication of multiple times based on random arrangement of the images greatly enhances security due to a nearly impossible probability of success. Particularly, in the password policy of the present disclosure, the authentication policy is very effective in enhancing security.

Accordingly, to prepare against attacks by a third party who randomly inputs passwords, when authentication of a password inputted from a user fails continuously a predetermined number of times, the user terminal 100 changes to a defense mode requiring the user to input the password multiple times and authentication of the password to be continuously successful. In the defense mode, when first authentication of the password inputted from the user succeeds, the user terminal 100 requires the user to continuously input the password again, and when second authentication of the password inputted from the user succeeds, determines authentication of the corresponding password to be successful. That is, in the defense mode, only when authentication of the password inputted from the user succeeds continuously at least twice, the authentication is determined to be valid. Thus, in the event of random password attacks by a third party, not only first password authentication but also second password authentication should continuously succeed, so a probability of success dramatically reduces and security is enhanced by the shift value and the random arrangement of the images. When authentication fails continuously a first predetermined number of times, the user terminal 100 changes from a normal mode to a defense mode, and in the defense mode, when authentication fails continuously a second predetermined number of times, determines as an attack by a third party and terminates the password input and authentication processing.

Figure 2:
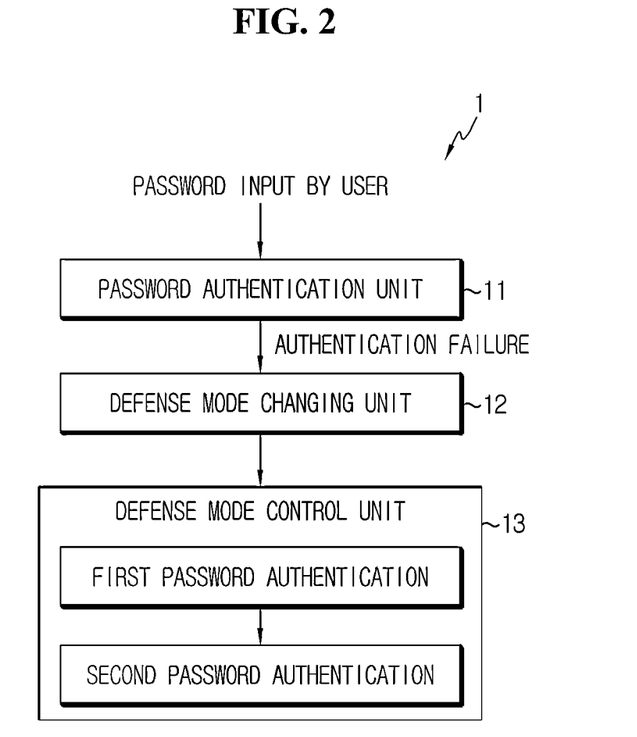
FIG. 2 is a diagram schematically illustrating the architecture of a password authentication system according to a first embodiment of the present disclosure.

FIG. 2 is a diagram schematically illustrating the architecture of the password authentication system 1 according to a first embodiment of the present disclosure.

The password authentication system 1 according to the first embodiment of the present disclosure includes a password authentication unit 11 to perform authentication processing of a password of a user, a defense mode changing unit 12 to change to a defense mode when authentication fails, and a defense mode control unit 13 to control continuous password input and authentication processing in the defense mode.

The password authentication unit 11 performs authentication processing by comparing the password inputted from the user to a pre-stored password. Here, the password authentication unit 11 applies a shift value inversely to the inputted password, compares the inversely applied password to the pre-stored original password, and when identical, determines authentication as a success.

The defense mode changing unit 12 changes to the defense mode requiring continuous authentication of multiple times when authentication of the password fails a predetermined number of times.

The defense mode control unit 13 controls the continuous authentication of multiple times on the password inputted from the user in the changed defense mode. In the defense mode, after authentication of the password inputted from the user succeeds first, the user is required to input the password again. Also, when second authentication of the password succeeds continuously, the defense mode control unit 13 determines the authentication to be valid and restores to the original normal mode. Subsequently, in response to the password authentication, a unique service is provided to the user.

Here, the defense mode control unit 13 may notify that it is now in the defense mode on a password input screen. Then, the user recognizes that he/she inputted an invalid password, and may carefully input a valid password.

Also, the defense mode control unit 13 provides a final authentication result only when last authentication succeeds during continuous authentication processing of multiple times. For example, under the assumption of continuous authentication three times, when first and second authentication succeeds, the defense mode control unit 13 omits to notify that authentication succeeded. It is because if during continuous authentication processing of multiple times, authentication processing results are notified each time, a third party may collect passwords for which authentication succeeded and prepare to input a next-time password. Thus, for the purpose of security, preferably, the defense mode control unit 13 omits to notify the authentication processing results until authentication succeeds multiple times continuously, and when authentication succeeds multiple times continuously, notifies of authentication success at the end.

Figure 3:
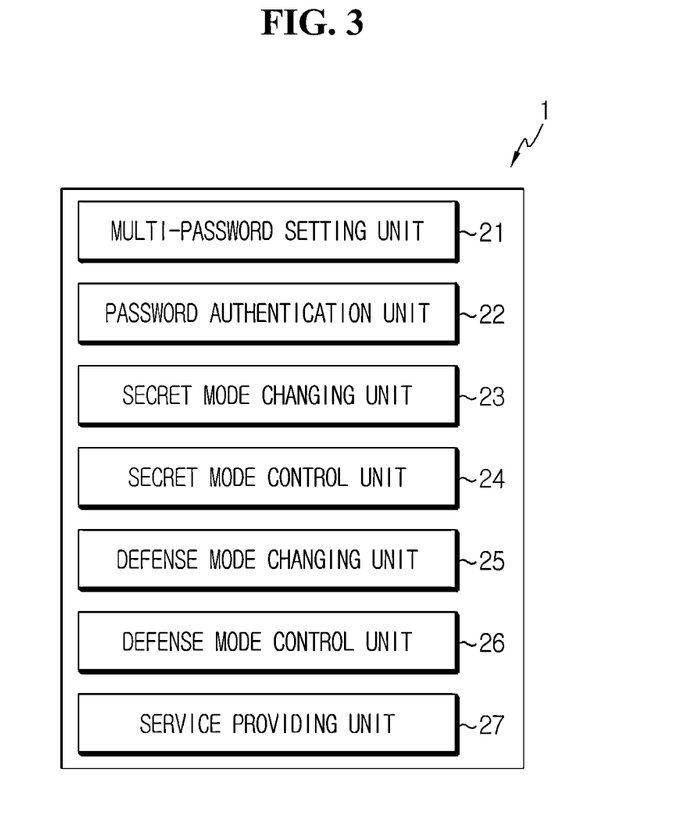
FIG. 3 is a diagram schematically illustrating the architecture of a password authentication system according to a second embodiment of the present disclosure.

FIG. 3 is a diagram schematically illustrating the architecture of the password authentication system 1 according to a second embodiment of the present disclosure.

The password authentication system 1 according to the second embodiment of the present disclosure works with a plurality of passwords, and for a more important password, involves continuous authentication of multiple times, dissimilar to the first embodiment.

The password authentication system 1 according to the second embodiment of the present disclosure includes a multi-password setting unit 21 to receive setting of a plurality of passwords of a user and its importance, a password authentication unit 22 to perform authentication processing of the password of the user, a secret mode changing unit 23 to change to a secret mode requiring continuous authentication when authentication of a password with high importance succeeds, a secret mode control unit 24 to control continuous password input and authentication processing in the secret mode, a defense mode changing unit 25 to change to a defense mode when authentication fails, a defense mode control unit 26 to control continuous password input and authentication processing in the defense mode, and a service providing unit 27 to provide a corresponding service when authentication succeeds for each password.

The multi-password setting unit 21 receives setting of the plurality of passwords from the user. Also, importance of a first password may be lower than importance of a second password among the plurality of passwords.

The password authentication unit 22 performs authentication processing of a password inputted from the user among the plurality of passwords on a password input screen. The password authentication unit 22 applies a shift value for each password inversely to the inputted password, compares the inversely applied password to pre-stored original passwords, and when any one is identical, determines authentication of the matched password as a success.

The secret mode changing unit 23 changes to a secret mode requiring continuous authentication of multiple times when a second password with high importance is inputted on the password input screen of a normal mode. The secret mode requires re-authentication at least once for the second password with relatively high importance.

The secret mode changing unit 24 controls the continuous authentication of the second password inputted from the user at least once in the changed secret mode. As authentication of the second password of the user has already succeeded in the normal mode, the mode was changed to the secret mode. Thus, if authentication of the second password of the user continuously succeeds in the secret mode, authentication of the second password would succeed at least twice continuously. When authentication of the second password succeeds continuously a number of times up to the standards, the authentication is determined to be valid and the secret mode goes back to the original normal mode. Subsequently, in response to authentication success of the second password, a unique service is provided to the user.

The defense mode changing unit 25 and the defense mode control unit 26 are identical to the defense mode changing unit 12 and the defense mode control unit 13 of the first embodiment as described in the foregoing, and a related description is omitted herein.

Here, when the password inputted from the user does not match any one of the plurality of passwords in the normal mode or secret mode, the defense mode changing unit 25 determines it as password unmatching and changes to the defense mode. When the number of password unmatching exceeds a preset number of times, the defense mode changing unit 25 may change from the normal mode or secret mode to the defense mode.

Also, the defense mode control unit 26 controls the password input and authentication processing based on continuous password authentication until authentication of the first password succeeds at least twice continuously or until authentication of the second password succeeds at least twice continuously. When password unmatching occurs a predetermined number of times, the defense mode control unit 26 may terminate the password input processing.

When authentication processing of any one of the plurality of passwords is determined to be successful by the password authentication unit 22, the service providing unit 27 provides a unique service corresponding to the password for which authentication succeeded. For example, when authentication of the first password inputted in the normal mode succeeds, the service providing unit 27 provides a first service corresponding to the first password. Also, after the second password succeeds in the normal mode, when authentication of the second password inputted in the secret mode continuously succeeds at least once, the service providing unit 27 provides a second service corresponding to the second password.

<2. Method Configuration>

Figure 4:
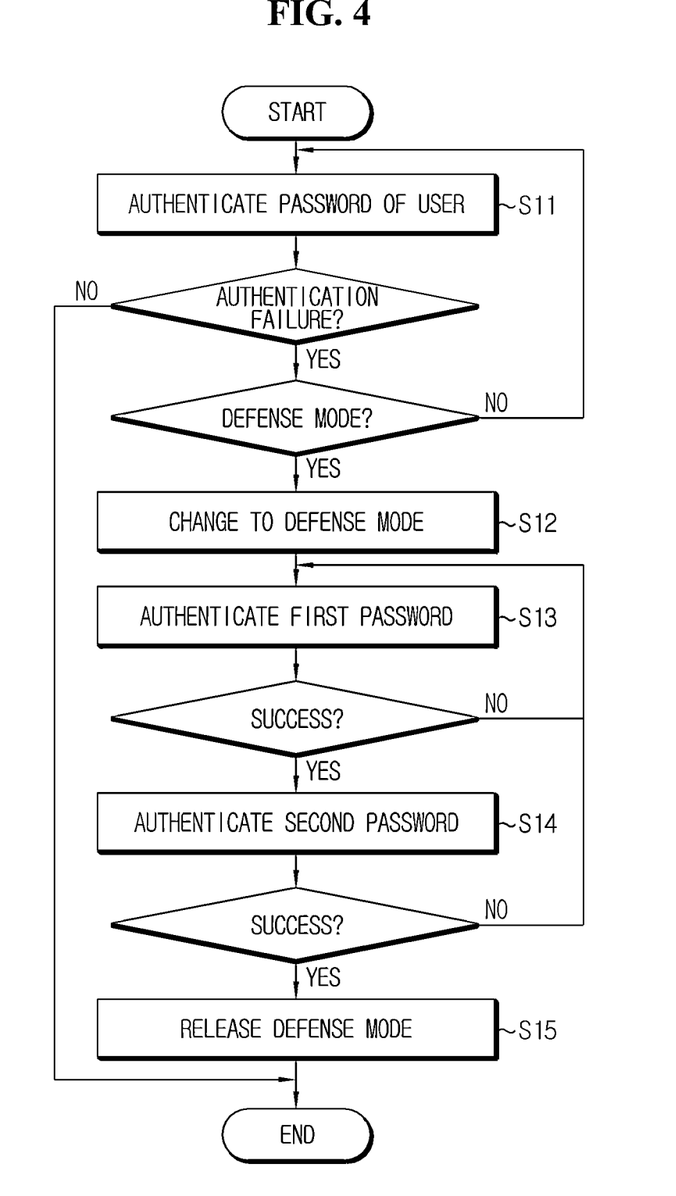
FIG. 4 is a flowchart schematically illustrating a password authentication method according to a first embodiment of the present disclosure.

FIG. 4 is a flowchart schematically illustrating a password authentication method according to a first embodiment of the present disclosure.

The password authentication system 1 outputs an interface where a plurality of icon images is randomly arranged on a screen for each password input instance. A user inputs, as a password, an image at a location subjected to a shift value from an image of an original password on the password input screen.

Subsequently, the password authentication system 1 authenticates the password inputted from the user (S11). When the password applied inversely by the shift value matches a preset original password, authentication of the password is determined as a success. When authentication of the password fails, the password authentication system 1 requires the user to re-input the password and repeats S11.

If the number of authentication failures exceeds a preset number of times, the password authentication system 1 changes a normal mode to a defense mode (S12). In the defense mode, it is required to succeed in authentication of the password multiple times continuously.

After the mode is changed to the defense mode, the password authentication system 1 requires first password input through screen output, and performs first authentication processing of the password inputted from the user (S13).

In the defense mode, when the first authentication succeeds, the password authentication system 2 continuously requires second password input, and performs second authentication processing of the password inputted from the user (S14).

When the first and second authentication processing succeeds continuously, the password authentication system 1 releases the defense mode and provides a corresponding service (S15). If authentication of the password fails in the defense mode, continuous authentication processing of the password starts again. Here, authentication of the password fails over a predetermined number of times, a password authentication request by the user may be rejected.

Figure 5:
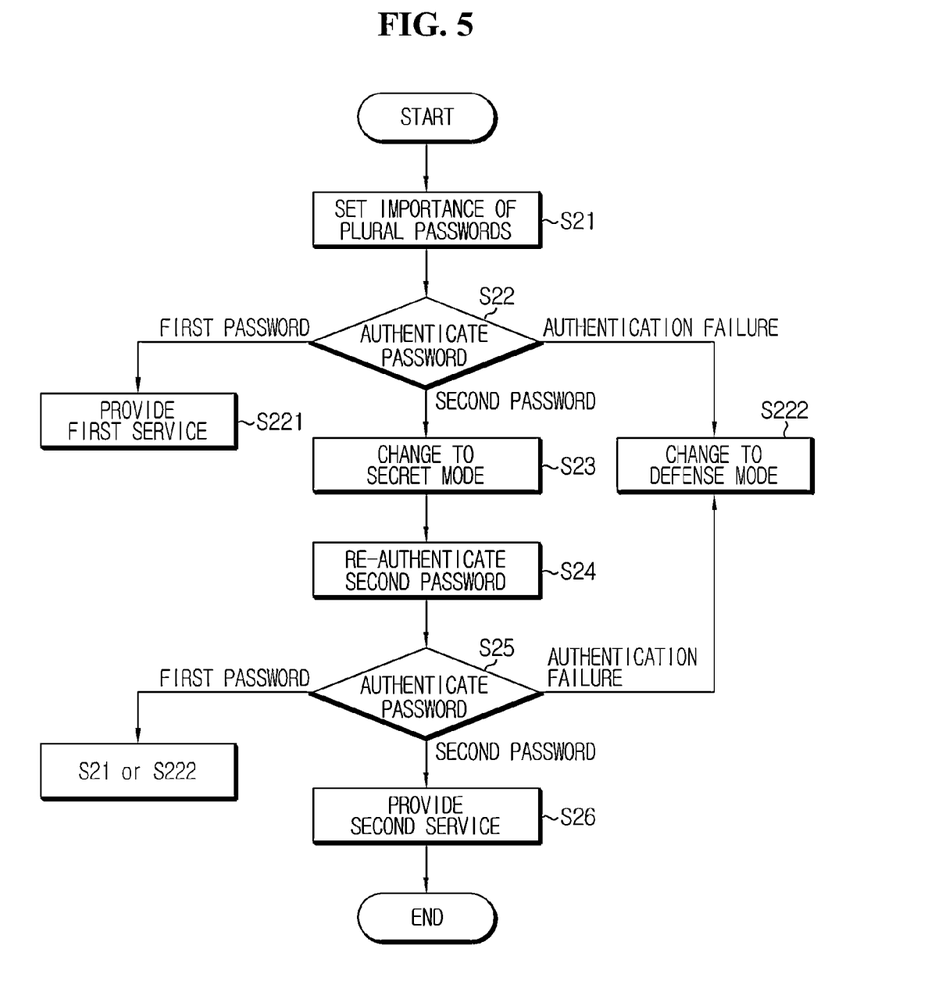
FIG. 5 is a flowchart schematically illustrating a password authentication method according to a second embodiment of the present disclosure.

FIG. 5 is a flowchart schematically illustrating a password authentication method according to a second embodiment of the present disclosure. The first embodiment of FIG. 4 may be included in the second embodiment.

The password authentication system 1 receives setting of a plurality of passwords and setting of importance corresponding to the individual passwords from a user (S21). A second password with higher importance than a first password involves continuous authentication of multiple times.

Subsequently, the password authentication system 1 receives an input of a password from a user through a password input screen where images are randomly arranged. Then, the password authentication system 1 authenticates the password inputted from the user (S22).

Here, when a first password is inputted, the password authentication system 1 provides a corresponding service in response to authentication success of the first password (S221). Also, when authentication of the password fails, determination as to whether to change to a defense mode is made (S222). When authentication fails over a predetermined number of times, a mode change to a defense mode may be made.

If a second password is inputted, for re-authentication of the second password with high importance, the password authentication system 1 changes from a normal mode to a secret mode involving continuous authentication of multiple times (S23).

In the changed secret mode, the password authentication system 1 receives a re-input of the second password from the user and performs re-authentication (S24).

Here, when the first password is inputted and authentication of the first password succeeded, the password authentication system 1 terminates the secret mode and goes to S22 and notifies the user of password input. Thus, authentication of the first password of the user is performed twice continuously. Alternatively, when authentication of the second password failed in the secret mode, the password authentication system 1 goes to S222 and determines whether to change to the defense mode.

When the second password is inputted in the secret mode and authentication of the second password succeeds twice continuously, the password authentication system 1 provides a corresponding service (S26). Here, in the secret mode, continuous authentication of the second password may be involved at least twice based on the importance of the password.

In the foregoing exemplary embodiments, the term "~unit" is not used to represent hardware components of the icon password setting apparatus 1. Thus, a plurality of components may be integrated into one component, and one component may be divided into a plurality of components. Also, the components may represent hardware components, but may also represent software components. Accordingly, it should be understood that the present disclosure is not specially limited by the term "~unit".

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. A password authentication system in which a password is set by a user using an original password and information associated with a shift value, and which receives an input of the password subjected to the shift value from the user and determines whether authentication of the password succeeded, the password authentication system comprising a user terminal comprising a processor and executable instructions which, when executed by the processor, implement:
   a password authentication unit configured to apply the shift value inversely to the input of the password from the user to obtain the original password and perform authentication processing, when a plurality of icon objects including at least one of number, character and image icons is randomly arranged on a screen for each input instance of password and selected as the password by the user;
   a defense mode changing unit configured to change to a defense mode requiring continuous authentication of the password at least twice when the authentication processing fails for the password; and
   a defense mode control unit configured to, in the defense mode, require the user to make a first input of the failed password, and when authentication processing of the first input of the password of the user succeeds through the password authentication unit, to require the user to make a second input of the failed password, and when authentication processing of the second input of the password of the user continuously succeeds through the password authentication unit, to determine the continuous authentication of the password of the user as a success and release the defense mode, and when authentication processing of the first or second input of the failed password of the user fails through the password authentication unit, to start again to request the user to make a first input of the failed password;
   wherein the defense mode control unit is configured to omit to notify the user of an individual authentication result for the first input and the second input until the continuous authentication of the password of the user succeeds continuously during the defense mode, and when the continuous authentication of the password succeeds continuously, notify the success through a screen.

2. The password authentication system according to claim 1, wherein the defense mode changing unit is configured to change from a normal mode to the defense mode when a number of authentication failures of the password exceeds a preset number of times in the normal mode.

3. The password authentication system according to claim 1, wherein the defense mode control unit is configured to notify the defense mode through an input screen of the password.

4. The password authentication system according to claim 1, further comprising:
   a multi-password setting unit configured to receive setting of a plurality of passwords of the user including a first password and a second password with higher security than the first password; and a service providing unit configured to provide a unique service corresponding to a password for which authentication succeeded when authentication processing of any one of the plurality of passwords succeeds by the password authentication unit.

5. The password authentication system according to claim 4, further comprising:

a secret mode changing unit configured to change to a secret mode requiring continuous repeated authentication of the second password when authentication of the input of the second password in a normal mode succeeds; and a secret mode control unit configured to, in the secret mode, require the user to re-input the second password, and when authentication processing of the input of the second password of the user succeeds through the password authentication unit, determine the authentication of the second password of the user as a success and release the secret mode, wherein the service providing unit is configured to provide a corresponding first service when authentication of the input of the first password in the normal mode succeeds, and provide a corresponding second service when authentication of the input of the second password in the secret mode succeeds.

6. The password authentication system according to claim 5, wherein when an input of the first password is received, the secret mode control unit is configured to change to the normal mode and notify a password input, or determine the authentication as a failure and change to a defense mode.

7. A password authentication method performed by a password authentication system in which a password is set by a user using an original password and information associated with a shift value, and which receives an input of the password subjected to the shift value from the user and determines whether authentication of the password succeeded, the password authentication method comprising:

a password input step of providing, by the password authentication system, an input screen of the password where a plurality of objects including at least one of number, character and image icons, selected as the password by the user, is randomly arranged for each password input instance;

a password authentication step of applying the shift value inversely to the input of the password from the user to obtain the original password and performing authentication processing;

a defense mode changing step of changing to a defense mode requiring continuous authentication of the password at least twice when the authentication processing fails for the password;

a first password input step of, in the defense mode, requiring the user to make a first input of the failed password through the input screen of the password input step;

a second password input step of, when authentication processing of the first input of the password of the user succeeds through the password authentication step, requiring the user to make a second input of the failed password through the input screen of the password input step;

a defense mode release step of, when authentication processing of the second input of the password of the user continuously succeeds through the password authentication step, determining the continuous authentication of the failed password of the user as a success and releasing the defense mode;

a restarting step of, when authentication processing of the first or second input of the password of the user fails through the password authentication step, starting again to request the user to make a first input of the failed password; and a notifying step of omitting to notify the user of an individual authentication result for the first input and the second input until the continuous authentication of the failed password of the user succeeds continuously during the defense mode, and when the continuous authentication of the failed password succeeds continuously, notifying the success through a screen.

8. The password authentication method according to claim 7, wherein the defense mode changing step comprises changing from a normal mode to the defense mode when a number of authentication failures of the password exceeds a preset number of times in the normal mode.

9. The password authentication method according to claim 7, wherein after the defense mode changing step, the password authentication system provides notification of the defense mode through the a screen for use in receiving the input of the password.

10. The password authentication method according to claim 7, further comprising:

before the password authentication step, a multi-password setting step of receiving, by the password authentication system, setting of a plurality of passwords of the user including a first password and a second password with higher security than the first password; and after the password authentication step, a service providing step of providing, by the password authentication system, a unique service corresponding to a password for which authentication succeeded when authentication processing of any one of the plurality of passwords succeeds.

11. The password authentication method according to claim 10, further comprising:

after the password authentication step, a secret mode changing step of changing, by the password authentication system, to a secret mode requiring continuous repeated authentication of the second password when authentication of the input of the second password in a normal mode succeeds; and a secret mode control step of, in the secret mode, requiring the user to re-input the second password, and when authentication processing of the input of the second password of the user succeeds through the password authentication step, determining the authentication of the second password of the user as a success and releasing the secret mode, wherein the service providing step comprises providing a corresponding first service when authentication of the input of the first password in the normal mode succeeds, and providing a corresponding second service when authentication of the input of the second password in the secret mode succeeds.

12. The password authentication method according to claim 11, wherein when an input of the first password is received in the secret mode, the password authentication system provides a first service or changes to the normal mode and notifies a password input.

* * * * *